UNITED STATES PATENT OFFICE.

LUDWIG PFLUG, OF KIEL, GERMANY.

SHIP'S PAINT.

SPECIFICATION forming part of Letters Patent No. 496,895, dated May 9, 1893.

Application filed July 25, 1892. Serial No. 441,197. (No specimens.)

*To all whom it may concern:*

Be it known that I, LUDWIG PFLUG, of Kiel, Germany, have invented certain new and useful Improvements in Composition for Ships' Paints; and I do hereby declare that the following is a full and clear description of the invention.

Of all the paints for the bottoms of ships now found in commerce, none comes up to the requirements. Up to the present time, some more or less poisonous substances were mixed into the paint in order to prevent plants or animals from fastening themselves to the ship. Practical experience shows that in almost all cases these additions do not accomplish their object.

Experiments have shown that "sublimates," when mixed in a ship's paint, have a bad effect on the inner coating of paint, eating it away in spots, and then attacking the metal of the ship's bottom, and seriously injuring it. Phenol and carbolic acid have also been added to ship's paint, but the effect was the same as when sublimates were employed. Poison by sublimates or arsenic, to be effective, must first enter by the alimentary or natural channel to the stomach, where the poison will be decomposed and then produce its poisonous effects.

No means, prior to my invention, have been discovered whereby a ship's paint could be certainly rendered poisonous to animals which have attached themselves to a ship's bottom, such as crustacea, &c. These animals therefore die a natural death, leaving empty shells or coverings with their dead tendrils or tentacles closely interwoven with each other in the paint. These empty shells or coverings furnish new resting places for other animals who are thus removed from any action of poison in the ship's paint. By my improved composition all these bad effects are obviated.

The present invention arises from the observation made by the inventor, that the living beings which we find at the bottom of every ship, in great masses and in considerable sizes, never attach themselves to the ship in completely developed condition, but almost exclusively in the condition of embryo. Only after these protoplasmatic masses, in embryo condition, have been forming for a longer time in the ocean, they find it necessary for their further development and propagation to attach themselves in glutinous masses, so to speak, where they find the opportunity, at the same time, of getting nourishment of every wave which attacks them. For that reason, we find these organisms attached to each object which is sufficiently exposed to sea water, be it stones, poles, buoys or ships. As these animals, whether they be in the stage of embryo or already further developed, lack any organ by which they could take up solid nourishment, or nourishment which is easily soluble, it is impossible for them to take up any solid substance or substances which do not dissolve easily, of poisonous nature, like sublimate, oxide of mercury, &c., and therefore, the addition of these substances does not prevent the attaching of the animals. From this observation, the inventor arrives at the conclusion that such poisonous substances should not be mixed with the ship's paint, but on the contrary, a substance which would have the effect of depriving the above mentioned protoplasmatic masses of their power of buoying and thereby to prevent them from developing into animals which become a plague to the ship. For that reason, the invention consists in giving to the ship's bottom, the quality of destroying every protoplasmatic mass which attaches to it, that is, to give it a coating to which a substance has been ad-mixed in sufficient quantity to exercise this peculiar effect. As such addition, any chemical substance may be used, which acts either coagulating or destroying, upon the said protoplasmatic masses, and on the other hand is indifferent toward the other elements constituting the ship's paint and to the hull of the ship itself.

My invention consists essentially in the addition to a ship's paint of hydrazin and its salts, or its equivalent, hydroxalamine and its salts, as hereinafter more fully described.

The substances, although they are not poisonous by themselves, act directly as coagulating means upon the albumen, therefore destroying the protoplasma of the living beings in question, and on the other hand do not exercise any influence upon the other constituent elements of the ship's paint, or upon the hull of the ship.

In coating a ship's bottom with paint, so as to receive the full benefit of my invention, I preferably use three coats of paint:

No. 1. is the bottom, or inner, coat next to the ship's bottom, and is composed of an entirely neutral paint varnish which prevents the metal of the ship's bottom from oxidation through the action of the sea-water. This first coat of paint must effectually isolate the other coats, must dry quickly, remain elastic and be of such consistency as to form a smooth coat when applied. This coat of paint, which I call No. 1, is prepared in the following manner. Copal is heated at various times and at varying degrees until the copal can be thoroughly granulated or comminuted. To this is then added about double the amount of linseed oil varnish. This mixture is then gradually heated and gradually cooled to about 110° centigrade when oil of turpentine is added and the whole mixture allowed to cool. When cooled, about one-fourth part in weight of caput mortuum is added together with a mixture of benzine, tar oil, galipot, resin, wax, stearine and Venetian turpentine. The whole mixture is again heated gradually to about 100° centigrade, and after being cooled is ground and packed in close vessels.

No. 2. This coat of paint is spread or applied over No. 1, and is made in the same manner as No. 1, but before grinding, there is added zinc oxide and litharge and then the hydrazin or hydroxalamine in the form of sulphates, in the proportion of two per cent., or more.

No. 3. This is the outer coat, and is spread or applied over No. 2, and is made by dissolving best shellac in about double the quantity of alcohol under a moderate heat, and then adding consecutively, one at a time, the following ingredients, viz: Linseed oil varnish, Venetian turpentine, galipot, and distilled copal; the whole mixture is then slowly heated until thoroughly commingled, and then allowed to cool, when caput mortuum, zinc and litharge are added, and afterward the hydrazin, or hydroxalamine, is added in the form of muriates, in the proportion of two per cent., or over. The whole mixture is then ground together in the usual manner.

It will be understood that each of these compounds Nos. 1, 2 and 3 are ground separately, and placed in separate closed cans.

As the hydrazin or hydroxalamine in the compound or coat No. 2 are in the form of sulphates, they are more difficult of solution, and it is not intended that they should have any practical effect until the outer coat No. 3 is used up or worn out, either wholly or in spots.

No. 3 contains, as before stated, the hydrazin and hydroxalamine in the form of muriates. This is easier of solution than the sulphates in No. 2, and therefore acts more directly upon any object it comes in contact with. This coat No. 3 is directly acted upon by the decomposition of the animals and their secretions, which have become attached to the ship, in conjunction with the sea-water, until the hydrazin and hydroxalamine can act on the next surrounding protoplasmatic layer by imbibition.

Coat No. 2, as above stated, cannot come into action until coat No. 3 has been used or worn off by friction of the water during sailing. This gradual or progressive solubility of the ingredients used is the chief reason for using these coats of paints Nos. 1, 2 and 3 in the order heretofore described.

Whenever I say hydrazin, I mean to have it embrace not only its equivalent hydroxalamine, but also all equivalent coagulators. It may also be mentioned that hydrazin acts very quickly and easily on the epidermis, and thus very easily reaches the protoplasmic substances within the epidermis. As these additions to the paint are only soluble in the proportion or degree they are attacked under water, the paint will last one to two years.

Late experiments with hydrazin have shown that some animals of the North and Baltic sea can withstand a solution of two per cent. only about five minutes. In a four per cent. solution death followed immediately—even crabs succumbed after ten minutes.

It is difficult to indicate proportions more definitely, as the same should necessarily be changed according to the nature of the sea-water in which the ship is chiefly intended to sail. Ships intended for service in the German sea only, for instance, require less of this addition to the paint than ships sailing in other seas. The proportion of this addition to the paint will vary from one to ten per cent., and sometimes even more.

What I claim as my invention is—

The herein described composition to be used as a ship's paint, combining therein hydrazin and its salts, substantially as specified and for the purpose described.

In testimony whereof I have signed my name to this specification in the presence of two subscribing witnesses.

LUDWIG PFLUG.

Witnesses:
FRANZ HASSLACHER,
FRIEDRICH CORRELL.